United States Patent

[11] 3,542,277

[72] Inventors Paul Wendell Andrews
Phoenix;
Mendell Ray Martin, Scottsdale, Arizona
[21] Appl. No. 715,683
[22] Filed March 25, 1968
[45] Patented Nov. 24, 1970
[73] Assignee Motorola Inc.
Franklin Park, Illinois
a corporation of Illinois

[54] WIRE BONDING NEEDLE AND METHOD FOR MAKING SAME
20 Claims, 3 Drawing Figs.
[52] U.S. Cl. .................................................. 228/54,
29/470.1; 228/3, 228/40, 228/44, 228/55
[51] Int. Cl. ............................................... B23k 3/02

[50] Field of Search ............................................ 228/3, 44,
54, 55; 29/470.1

[56] References Cited
UNITED STATES PATENTS
3,358,897 12/1967 Christensen .................. 228/54

*Primary Examiner*—John F. Campbell
*Assistant Examiner*—Robert J. Craig
*Attorney*—Mueller, Aichele & Rauner ABSTRACT: Disclosed is a novel wire bonding tool and method for making same. The tool is constructed using a small, replaceable washer-shaped tip of durable material, and this tip is bonded to a capillary member of the bonding needle. Also disclosed is a novel bonding tip comprising a ceramic alumina composition which may be of washerlike shape or other geometrical configuration which is suitable for wire bonding.

Patented Nov. 24, 1970   3,542,277

INVENTOR.
Mendell Ray Martin
Paul Wendell Andrews
BY Mueller, Aichele, & Rauner
Atty's 3,542,277

WIRE BONDING NEEDLE AND METHOD FOR MAKING SAME

BACKGROUND OF THE INVENTION

This invention relates generally to the art of wire bonding and more particularly to wire bonding needles and a method for making same.

Prior art bonding needles are typically constructed using at least two metal members which are joined together, and one of these members is adapted to be in direct physical contact with the wire being bonded during the wire bonding process. Each of the members has a passage therein through which a continuous wire passes, and this wire is very small, generally ranging between .005 inches and .0001 inches.

The member of the needle which does not physically contact the wire being bonded is commonly referred to as a capillary shank, and the capillary shank has a configuration which permits the shank to be held by an arm member of a wire bonding machine or to be inserted in some way in the bonding machine and removed therefrom for cleaning, reconstruction, or repair. The member of the bonding needle which is in direct physical contact with the wire being bonded is commonly referred to as the needle tip. The needle tip may be welded to the capillary shank or forceably compressed into a cavity in the shank so that it can be removed and replaced when worn out. The needle tip of presently available prior art bonding needles is an elongated, cylindrical member having a frustoconical end portion thereof, and the surface of the small end of the frustoconical end portion makes direct physical contact with wires during bonding. By thermocompression, ultrasonic, or other bonding methods, the tip bonds the wire to a structure such as a semiconductor die.

The above described prior art bonding needle has two distinct disadvantages. The first of these disadvantages is that when the very end portion of the elongated tip wears down and becomes dull, the entire tip must be replaced by a new one so that the needle can function properly. In other words, the entire tip is usually destroyed only because the very end portion thereof is worn down by the continuous frictional engagement with the surface of the semiconductor die or other similar member to which the wires are bonded.

The other main disadvantage of the prior art bonding needles is that the materials used in constructing the needle tips are not extremely durable and do not permit the tip to be used for long periods of time.

SUMMARY OF THE INVENTION

An object of this invention is to provide a new and improved bonding needle having a novel replaceable tip.

Another object of this invention is to provide a new and improved needle tip of novel, geometrical configuration which may be used with either new or presently existing bonding needles.

Another object of this invention is to provide a novel method for reclaiming existing bonding needles or for fabricating new bonding needles.

A further object of this invention is to provide a new and improved bonding needle tip comprised of a material more durable than existing materials and exhibiting longer wear than any bonding needle tips presently known.

A feature of this invention is the provision of a new and improved washer-shaped bonding needle tip.

Another feature of this invention is the provision of a bonding needle tip comprised of an alumina ceramic material.

A further feature of this invention is a method of fabricating or reclaiming bonding needles in which a washer-shaped needle tip is bonded in a receptacle in the end portion of a frustoconical member of a bonding needle.

These and other objects and features of this invention will become more readily apparent in the following description of the accompanying drawing.

IN THE DRAWINGS

Briefly described, this invention is embodied in a wire bonding needle and method for making same wherein a very small washer-shaped tip is bonded in a receptacle in the end portion of a frustoconical member of the bonding needle. The washer-shaped tip is generally a metal or a ceramic material, and exemplary materials for fabricating the tip are listed below in the following description of the invention. The present invention is embodied in a novel combination of members constituting the bonding needle and is also directed to the needle tip per se which is of a washer-shaped geometrical configuration. The present invention is also embodied in a method for fabricating or reclaiming bonding needles by affixing a replaceable washer-shaped tip of durable material to the end of the needle.

Figure 1:
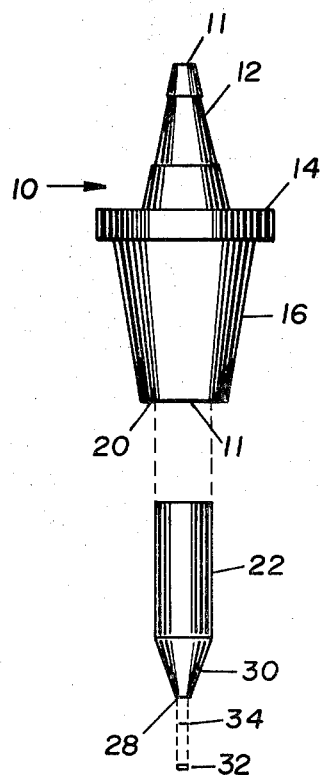
FIG. 1 is an exploded view of the bonding needle according to this invention.
Figure 2:
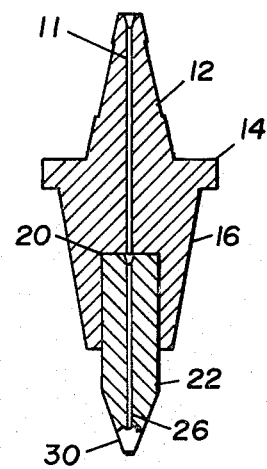
FIG. 2 is a cross section view of the bonding needle according to this invention.

Referring to the drawing in detail, there is shown in the exploded view of FIG. 1 a bonding needle which includes a holding means 10 having a passage 11 therein through which a continuous wire passes during the bonding operation. The holding means 10 is commonly referred to in the wire bonding art as a capillary shank. This shank has frustoconical end portions 12 and 16 joined to an intermediate flange portion 14 which facilitates the handling of the holding means 10 and the mounting of same on the arm of a wire bonder (not shown). The bonding needle in FIG. 1 further includes an elongated end member 22 having a frustoconical end portion 30, and the end member 22 is forceably compressed into a chamber or cavity 20 within the holding means 10. In this manner, the end member 20 may be removed and replaced if necessary. Both the holding means 10 and the end member 22 may advantageously be constructed of stainless steel or aluminum using known metal working processes.

The structure described thus far is the exact structure of the prior art bonding needles described in the section of this specification entitled "Background of the Invention". When the extreme end of the frustoconical portion became worn out after a predictable number of hours of wire bonding, the entire elongated end member 22 had to be replaced with another member of identical shape before the bonding could be continued. Actually, it was only the very end portion of the member 22 which would become worn out, but the entire member 22 had to be removed and replaced with a new member in order to have a desired tip shape for bonding. The prior art end members corresponding to end member 22 of the present invention are sometimes referred to as needle "tips", but the name "tip" is somewhat of a misnomer for a member as large and elongated as the elongated member 22 of the present invention. For this reason, the elongated end member 22 will be referred to herein as an "end member", and the washer-shaped tip 32 which is in direct physical contact with the bonded wires will be referred to as the needle "tip". Reference character 34 in FIG. 1 identifies the solder glass used to bond the tip 32 in a receptacle in the end member 22 and this bond will be described further below with reference to FIG. 3.

Figure 3:
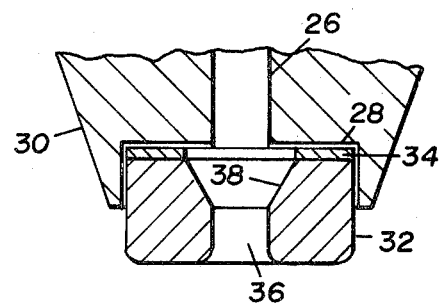
FIG. 3 is an enlarged cross section view of the end portion of the needle and novel washer-shaped needle tip according to the present invention.

The washerlike geometrical configuration for the bonding tip 32 is clearly shown in the enlarged cross section view in FIG. 3 and the tip 32 is bonded in a receptacle 28 in the frustoconical portion 30 of member 22 with a solder glass 34. Tip materials are given in the table below. One type of solder glass which has been used successfully in practicing the present invention is commercially available at the Corning Glass Works under the trade name of PYROCERAM. For a further and more complete discussion of solder glasses, reference may be made to an article in the Mar. 1956 issue of the Journal of the American Ceramic Society by Robert H. Dalton, pages 109 et seq.

The washer-shaped tip 32 has a passage 36 in one end thereof through which wires pass and also features another larger conical passage 38 for receiving the wires from the passage 26 in the end member 22. Washer-tip 32 has been constructed with an outside diameter of .005—.030 inch and an inside diameter of passage 36 of .001—.015 inch. The tapered edge of passage 38 slants at an angle from between 15° to 25° and has an opening of between .003 inch and .015 inch at the washer interface. The washer-shaped tip 32 is not limited to a particular material composition and may be constructed of any material which is durable and suitable for a long tip life.

The washer-shaped tip 32 may be formed by mixing the primary and secondary materials in the table below and suspending these materials in a liquid filler such as a polyacrylic resin. The filler is then allowed to dry in the form of a flexible tape, and washerlike tips are cut from the dried tape in a geometrical configuration illustrated in FIG. 3. After the washerlike tips 32 are cut, they are fired in air or a reducing atmosphere at temperatures at or exceeding 1000°C. to burn off the filler material, melt the tips, and leave the washerlike tips comprising the primary and secondary materials listed in the table below when the tips have cooled. The washerlike tips may be fired at temperatures ranging from 1000°C. to 2000°C. in either air or a reducing atmosphere such as hydrogen or nitrogen. An optimum firing temperature within this range has been found to be approximately 1,600°C.

TABLE.—WASHER MATERIAL

| Primary material | Percent | Secondary material | Percent |
| --- | --- | --- | --- |
| $Al_2O_3$ | 85–99 | $SiO_2$ | 15–1 |
| WC | 90–99 | Co | 10–1 |
| $SiO_2$ | 100 | | |
| $SiO_2$ | 99–50 | $Al_2O_3$ | 1–50 |
| W | 100 | | |
| WCTiC | 90–99 | Co | 10–1 |
| WCTaC | 90–99 | Co | 10–1 |

After the tips have been fired, they are bonded to the end member 22 by heating the solder glass 34 within the receptacle 28 to approximately 400°C. When the solder glass 34 melts, the needle tips 32 are compressed lightly in the receptacle 28 and the tips 32 become firmly bonded to the end member 22 once the solder glass, e.g., PYROCERAM layer 34, cools.

Whereas, a needle tip of novel geometrical configuration has been described above, the present invention is not limited to the washerlike configuration when alumina ceramic material is used. That is, of the materials listed in the table above, the alumina ceramic material has never before been used to form the needle tip. Such alumina ceramic tip is believed to be new and unobvious and, accordingly, with respect to said alumina ceramic material, the needle tip according to the present invention is not limited to the washerlike geometrical configuration 32 as shown in FIG. 3. As indicated in the above table, the alumina ceramic tip may consist of between 85 percent and 99 percent $Al_2O_3$ and between 15 percent and 1 percent $SiO_2$. The optimum percentages within this range have been found to be 96 percent $Al_2O_3$ and 4 percent $SiO_2$.

Various modifications may be made to the above described embodiments of this invention without departing from the scope thereof. For example, the particular washerlike geometrical configuration of the needle tip described may be modified within the scope of this invention so that the tip may not, in fact, be the shape of a washer at all. However, the present invention may be practiced as long as the tip is adapted to be mounted on an end member such as member 22, has an opening therein through which wires may pass, and is replaceable. Additionally, the solder glass used to bond the tip to the end member 22 of the needle may be replaced with a refractory metal, a plastic adhesive, or various types of ceramic to metal seals within the scope of this invention. Accordingly, the present invention is limited only by way of the following appended claims.

We claim:

1. A bonding needle comprising:
   an elongated member with a passage therein through which wires may pass, an upper portion of said member being cylindrical and a lower portion of said member being frustoconical in shape;
   a small, replaceable, washer-shaped tip having a passage therein and secured to the lower end of said elongated member, said tip being in direct physical contact with wires during the wire bonding process; and
   the lower end of said elongated member being shaped for receiving said tip.

2. The improvement defined in claim 1 wherein said tip is comprised of between 85 percent and 99 percent $Al_2O_3$ and between 15 percent and 1 percent of $SiO_2$, respectively.

3. The improvement defined in claim 1 wherein said tip is comprised of between 90 percent and 99 percent tungsten carbide and between 10 percent and 1 percent cobalt.

4. The improvement defined in claim 1 wherein said tip is comprised of 100 percent silicon dioxide.

5. The improvement defined in claim 1 wherein said tip is comprised of 100 percent tungsten.

6. The improvement defined in claim 1 wherein said tip is comprised of between 90 percent and 99 percent tungsten carbide and titanium carbide and between 10 percent and 1 percent cobalt.

7. The improvement defined in claim 1 wherein said tip is comprised of between 90 percent and 99 percent tungsten carbide and tantalum carbide and between 10 percent and 1 percent cobalt.

8. The improvement defined in claim 1 wherein said tip is comprised of between 99 percent and 50 percent $SiO_2$ and between 1 percent and 50 percent $Al_2O_3$, respectively.

9. The improvement defined in claim 1 wherein said tip is comprised of approximately 96 percent $Al_2O_3$ and approximately 4 percent $SiO_2$.

10. A bonding needle including, in combination:
    an elongated end member having a passage therein through which wires may pass, one end of said elongated member being frustoconical in shape; and
    a small cylindrical washer-shaped bonding tip having a passage therein and mounted in said one end of said elongated end member, and bonding wires adapted to pass through said hole in said tip and be in direct physical contact with said tip during the bonding process.

11. The combination defined in claim 10 wherein said bonding needle tip is comprised of between 85 percent and 99 percent $Al_2O_3$ and between 15 percent and 1 percent of $SiO_2$, respectively.

12. The combination defined in claim 10 wherein said bonding needle tip is comprised of between 90 percent and 99 percent tungsten carbide and between 10 percent and 1 percent cobalt, respectively.

13. The combination defined in claim 10 wherein said bonding needle tip is comprised of 100 percent silicon dioxide.

14. The combination defined in claim 10 wherein said bonding needle tip is comprised of 100 percent tungsten.

15. The combination defined in claim 10 wherein said bonding needle tip is comprised of between 90 percent and 99 percent tungsten carbide and titanium carbide and between 10 percent and 1 percent cobalt, respectively.

16. The combination defined in claim 10 wherein said bonding needle tip is comprised of between 90 percent and 99 percent tungsten carbide and tantalum carbide and between 10 percent and 1 percent cobalt.

17. The combination defined in claim 10 wherein said bonding needle tip is comprised of approximately 96 percent $Al_2O_3$ and approximately 4 percent $SiO_2$.

18. The combination defined in claim 10 wherein said one end of said member is receptacle shaped to receive said washer-shaped tip and said washer-shaped tip is bonded in said receptacle in said elongated end member with a solder glass.

19. The combination defined in claim 18 wherein said elongated end member is secured to a holding means and said holding means is adapted for mounting on the locating motion member of a wire bonder.

20. The combination defined in claim 19 wherein said holding means is a capillary shank having frustoconical end portions joined to an intermediate flange portion and having a passage therein through which wires may pass to the passages in said elongated end member and said cylindrical tip.